(12) United States Patent
Kalantari et al.

(10) Patent No.: US 10,767,683 B2
(45) Date of Patent: Sep. 8, 2020

(54) THREAD PROFILES FOR ROTARY SHOULDERED CONNECTIONS

(71) Applicant: DRECO ENERGY SERVICES ULC, Edmonton, Alberta (CA)

(72) Inventors: Masoud Kalantari, Calgary (CA); Nicholas Ryan Marchand, Edmonton (CA)

(73) Assignee: Dreco Energy Services ULC, Edmonton (CA)

( * ) Notice: Subject to any disclaimer, the term of this patent is extended or adjusted under 35 U.S.C. 154(b) by 83 days.

(21) Appl. No.: 15/554,188

(22) PCT Filed: Feb. 26, 2016

(86) PCT No.: PCT/CA2016/000051
§ 371 (c)(1),
(2) Date: Aug. 28, 2017

(87) PCT Pub. No.: WO2016/134451
PCT Pub. Date: Sep. 1, 2016

(65) Prior Publication Data
US 2018/0023611 A1    Jan. 25, 2018

Related U.S. Application Data

(60) Provisional application No. 62/121,508, filed on Feb. 27, 2015.

(51) Int. Cl.
*F16B 33/02* (2006.01)
*E21B 17/042* (2006.01)

(52) U.S. Cl.
CPC ............ *F16B 33/02* (2013.01); *E21B 17/042* (2013.01)

(58) Field of Classification Search
CPC .................................. F16B 33/02; F16B 33/04
USPC ............................................ 411/366.1, 366.3
See application file for complete search history.

(56) References Cited

U.S. PATENT DOCUMENTS

| | | | | |
|---|---|---|---|---|
| 4,040,327 A * | 8/1977 | Otaki | ...................... | F16B 33/02 411/423 |
| 4,549,754 A | 10/1985 | Saunders et al. | | |
| 4,842,466 A * | 6/1989 | Wheeler | ................. | F16B 33/02 411/366.3 |
| 4,846,614 A * | 7/1989 | Steinbock | ............... | F16B 33/02 411/307 |

(Continued)

FOREIGN PATENT DOCUMENTS

EP    1705415 A2    9/2006

OTHER PUBLICATIONS

International Search Report dated Jun. 2, 2016, for application No. PT/CA2016/000051.

(Continued)

*Primary Examiner* — Flemming Saether
(74) *Attorney, Agent, or Firm* — Conley Rose, P.C.

(57) ABSTRACT

A thread profile for rotary shouldered threaded connections uses different thread root radii for the pin thread and the box thread in order to optimize stress distribution and maximize thread contact area. The thread profile may be adapted for use in double-shouldered, two-start, taper-threaded connections to replace currently-used threaded connections such as the rotor-to-adapter connection in a downhole motor. The thread profile may incorporate an undercut buttress design.

10 Claims, 6 Drawing Sheets

(56) References Cited

U.S. PATENT DOCUMENTS

| | | | | |
|---|---|---|---|---|
| 4,861,209 A | * | 8/1989 | Larsson | E21B 17/0426 |
| | | | | 411/411 |
| 4,915,559 A | * | 4/1990 | Wheeler | F16B 33/02 |
| | | | | 411/366.3 |
| 4,943,094 A | * | 7/1990 | Simmons | E21B 17/042 |
| | | | | 285/333 |
| 5,060,740 A | * | 10/1991 | Yousef | E21B 17/0426 |
| | | | | 175/415 |
| 5,549,336 A | * | 8/1996 | Hori | E21B 17/042 |
| | | | | 285/333 |
| 6,030,004 A | * | 2/2000 | Schock | E21B 17/042 |
| | | | | 285/333 |
| 6,467,818 B1 | | 10/2002 | Snapp et al. | |
| 7,150,479 B2 | | 12/2006 | Benedict et al. | |
| 7,416,374 B2 | | 8/2008 | Breihan et al. | |
| 7,753,631 B2 | * | 7/2010 | Sugimura | F16B 33/02 |
| | | | | 411/308 |
| 8,061,946 B2 | * | 11/2011 | Komine | F16B 33/02 |
| | | | | 411/366.3 |
| 8,465,240 B2 | * | 6/2013 | Corbett | F16B 29/00 |
| | | | | 411/366.1 |
| 9,611,694 B2 | * | 4/2017 | Beronius | F16B 33/02 |
| 2003/0156918 A1 | | 8/2003 | Benedict et al. | |
| 2006/0042707 A1 | * | 3/2006 | Sugimura | F15B 1/106 |
| | | | | 138/30 |
| 2006/0222475 A1 | | 10/2006 | Breihan et al. | |

OTHER PUBLICATIONS

Extended European Search Report dated Sep. 18, 2018, for Application No. EP 16754683.7.

Chinese First Office Action dated Oct. 31, 2018, for Application No. 201680012531.X and English translation.

Chinese Second Office Action dated Jul. 23, 2019, for Application No. 201680012531.X and English translation.

"Thread Standard and Inspection Manual", Xiao en XU, pp. 762-765, China Metrology Press, first edition, Publication date Dec. 31, 1991.

"Questions and Answers on CNC Lathe Operation and Programming", Yajun Cao, pp. 119-210, Liaoning Science and Technology Press, first edition, Publication date Apr. 30, 2012.

Chinese Third Office Action dated Mar. 23, 2020, for Application No. 201680012531.X and English translation.

"Mechanical Design Basis", Yuping Dong, p. 124, China Machine Press, Aug. 1999, Edition 1, Publication date Aug. 31, 1999.

* cited by examiner

THREAD PROFILES FOR ROTARY SHOULDERED CONNECTIONS

CROSS-REFERENCE TO RELATED APPLICATIONS

This application is a 35 U.S.C. § 371 national stage application of PCT/CA2016/000051 filed Feb. 26, 2016, entitled "Thread Profiles for Rotary Shouldered Connections," which claims the benefit of U.S. 62/121,508 filed Feb. 27, 2015, both of which are incorporated herein by reference in their entirety for all purposes.

FIELD OF THE DISCLOSURE

The present disclosure relates in general to threaded connections for tubular members, including but not limited to oilfield tubulars for drill strings and casing strings. In particular, the disclosure relates to rotary shouldered threaded connections providing reduced susceptibility to galling in high-torque applications.

BACKGROUND

The demand for improved thread profile and connection designs is continually increasing with the demand for high-torque operations in the drilling of wellbores in the oil and gas industry. Thread damage due to galling or over-torquing is a common concern for threaded connections, especially in high-torque applications. In recent years, new downhole motor power sections have been developed that can produce torques greatly exceeding the torque capacity of known threaded connection designs.

In general, the torsional capacity and fatigue resistance of a threaded connection can be improved by maximizing the root radius of the thread profile in order to decrease stress concentrations in these critical areas. However, simply increasing a thread's root radius comes at the cost of decreasing the contact area of the thread's load flank, which increases the contact stresses during connection make-up, making the connection more susceptible to galling.

Another way to increase the torsional capacity of a threaded connection is to add a secondary make-up shoulder, forming what is known in the industry as a double-shouldered connection. However this subjects to the threads to increased axial loading, which also increases the likelihood of galling.

One example of a problematic threaded connection is the rotor connection of a downhole motor power section. In order to withstand the higher torque output of modern power sections, it may be necessary to employ a double-shouldered connection. Typical double-shouldered connection designs utilize straight threads in order to maximize the shoulder contact areas between the pin and the box.

However, when galling or other thread damage occurs in a straight rotor connection, it is commonly necessary for the rotor box to be replaced and stub-welded in order to repair the thread damage. The process of replacing and stub-welding the rotor box is roughly ten times more costly than the "chase and reface" repair process that can be performed to repair the same type of damage on a connection having tapered threads. A high-torque, tapered-thread alternative to the current straight connection would provide large savings based on the current frequency of rotor stub welding. Accordingly, there is a need for improved threaded connections that are capable of handling torques greater than the torque capacity of currently-used connections, and which can be chased and refaced in the event of thread damage.

BRIEF SUMMARY

The present disclosure teaches a new thread profile concept for use in rotary shouldered threaded connections that uses differential root radii between the pin and the box in order to optimize stress distribution and maximize thread contact area. In particular, specific embodiments are illustrated for double-shouldered, two-start, taper-threaded connections that can replace currently-used threaded connections such as the rotor-to-adapter connection in a downhole motor.

Accordingly, in a first aspect the present disclosure teaches a rotary shouldered connection comprising a pin element having a pin thread, with the pin thread having a pin thread stab flank, a pin thread load flank, a pin thread angle, and a pin thread root radius; and a box element having a box thread, with the box thread having a box thread stab flank, a box thread load flank, a box thread angle, and a box thread root radius that is different from the pin thread root radius. The pin thread root radius may be either larger or smaller than the box thread root radius.

In one embodiment, the pin thread and the box thread may incorporate mating V-thread profiles, which may be symmetrical V-thread profiles or in variant embodiments may be non-symmetrical V-thread profiles.

The pin thread angle may be shallower than the pin thread angle in conventional thread designs. The pin thread root radius may be appreciably larger than the pin thread root radius in conventional thread designs.

In a second aspect, the present disclosure teaches a rotary shouldered connection comprising a pin element having a pin thread, with the pin thread having a pin thread stab flank, a pin thread load flank, a pin thread angle, and a pin thread root radius; and a box element having a box thread, with the box thread having a box thread stab flank, a box thread load flank, a box thread angle, and a box thread root radius that is different from the pin thread root radius, but wherein the pin thread and the box thread incorporate mating buttress thread profiles, characterized by the pin thread profile including a pin thread undercut and with the box thread including a box thread undercut.

In some embodiments in accordance with this second aspect, the pin thread undercut may be non-tangent to the pin thread stab flank, and also may be tangent to the pin thread load flank. Similarly, the box thread undercut may be non-tangent to the box thread stab flank, and also may be tangent to the box thread load flank.

Embodiments of connections in accordance with either of the above-noted first and second aspects of the disclosure may be taper-threaded connections, and may also be double-shouldered connections.

BRIEF DESCRIPTION OF THE DRAWINGS

Embodiments will now be described with reference to the accompanying Figures, in which numerical references denote like parts, and in which.

DETAILED DESCRIPTION

Embodiment #1—Connection Having Differential V-Thread Profile

Figure 1:
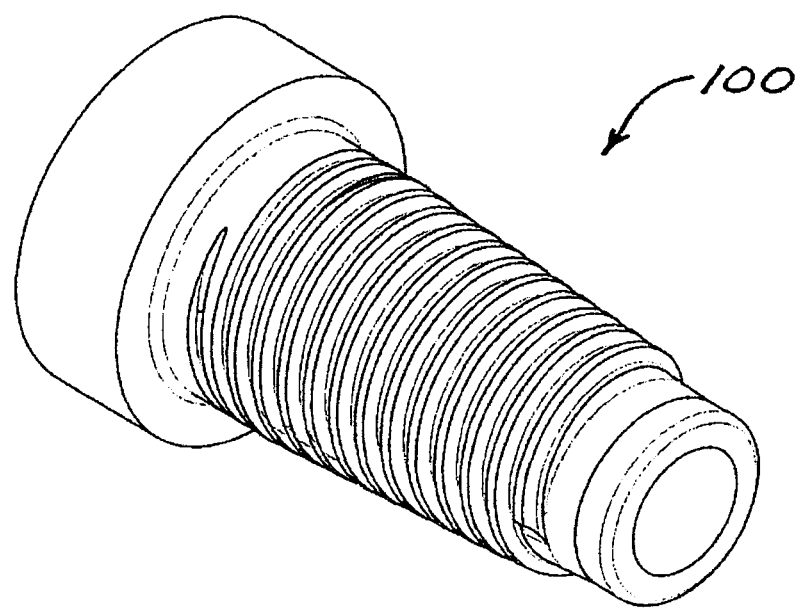
FIG. 1 is a semi-transparent isometric view of a first embodiment of a double-shouldered, tapered-thread connection in accordance with the present disclosure.
Figure 2:
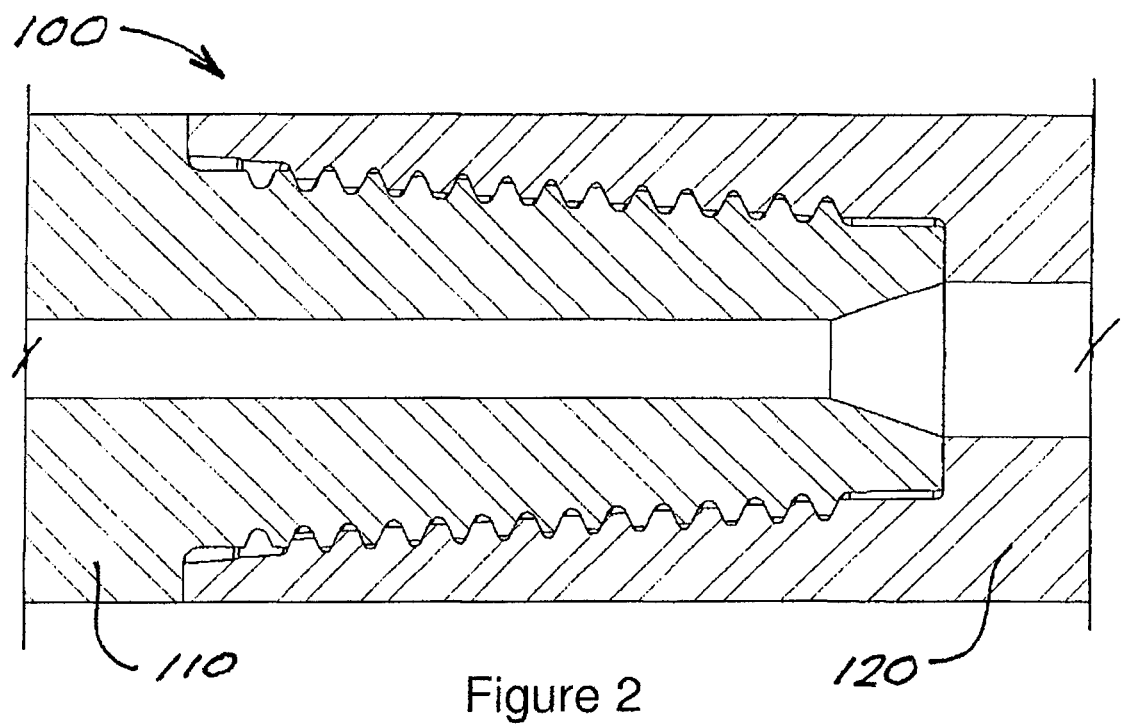
FIG. 2 is a cross-section through the connection shown in FIG. 1.

FIGS. 1-6 illustrate a first embodiment 100 of a double-shouldered, tapered-thread, two-start, rotary shouldered connection in accordance with the present disclosure, comprising a pin element ("pin") 110 and a box element ("box") 120. One distinctive feature of this connection is that the thread profiles for pin 110 and box 120 are different. FIG. 2 illustrates the full engagement of the pin and box thread profiles. The pin and box thread profiles engage in a manner that is advantageous for both the pin and the box, as will be explained in greater detail later herein.

Figure 3:
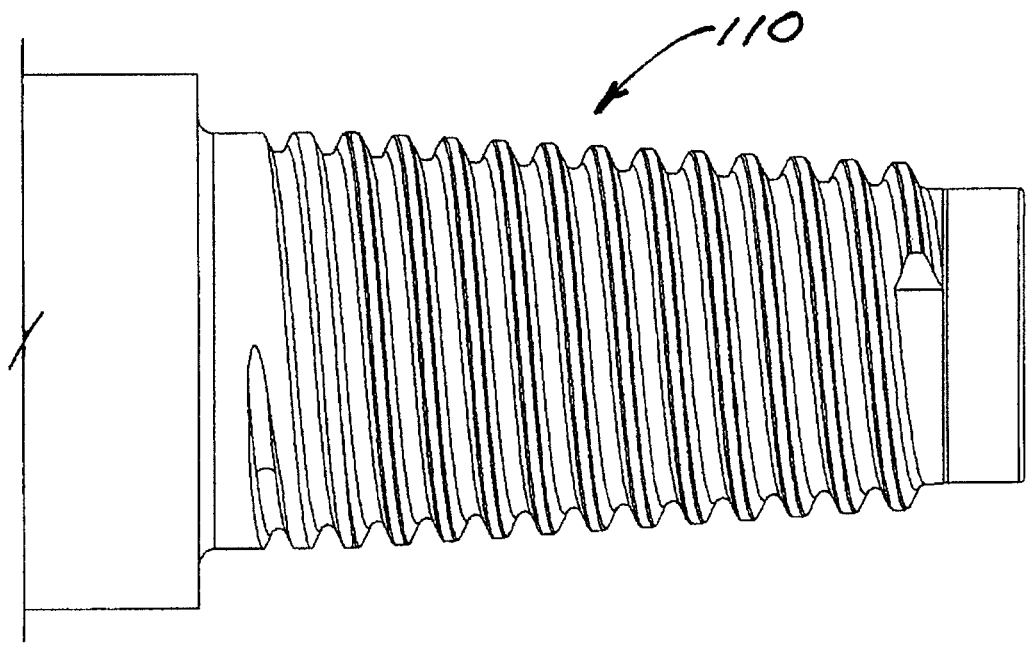
FIG. 3 is a side view of the pin element of the connection shown in FIG. 1.
Figure 4:
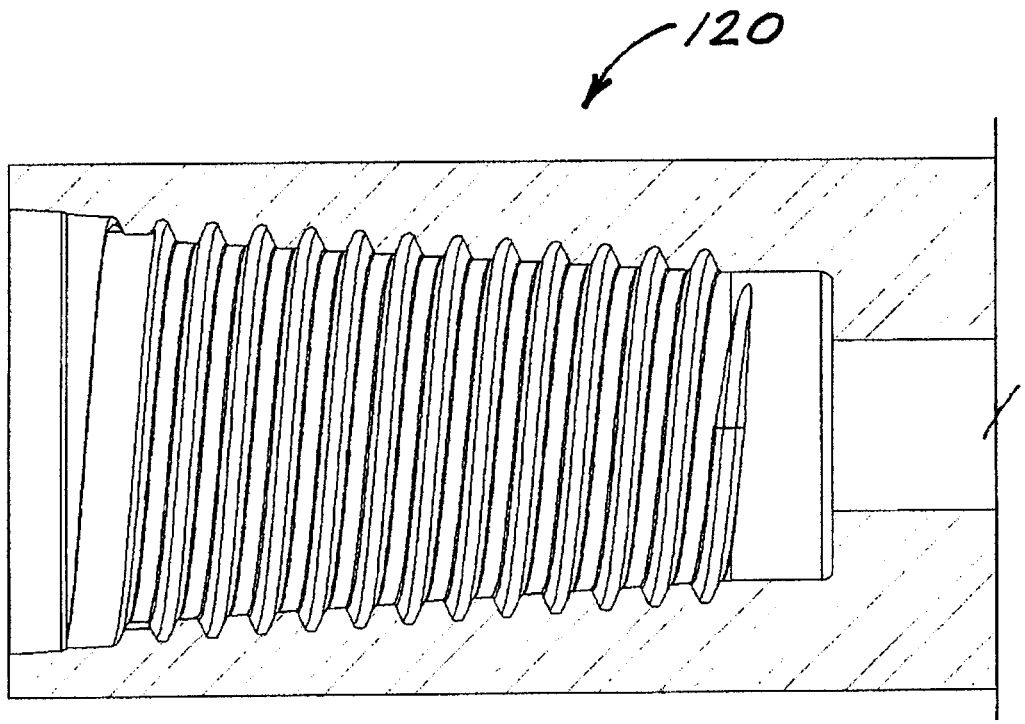
FIG. 4 is a cross-section through the box element of the connection shown in FIG. 1.

FIGS. 3 and 4 separately illustrate pin element 110 and box element 120.

Figure 5:
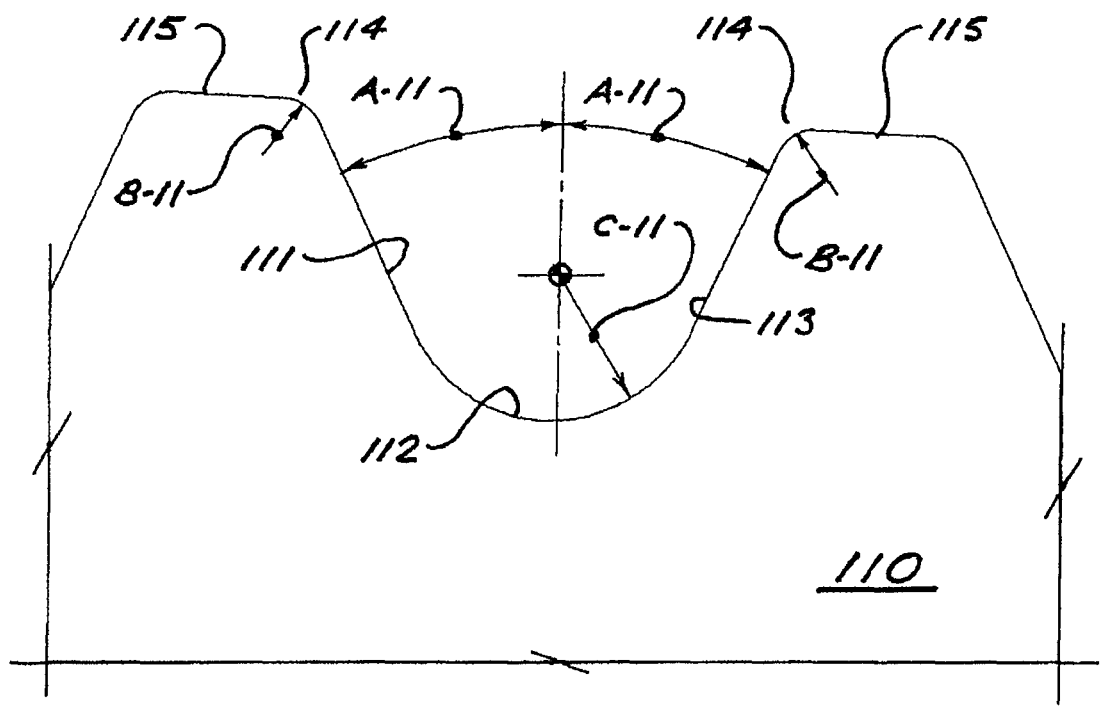
FIG. 5 illustrates the thread profile of the pin element shown in FIG. 3.

FIG. 5 illustrates the differential V-thread profile for pin 110, comprising a pin thread stab flank 111, a pin thread load flank 113, a pin thread root 112 (with a thread root radius C-11), a pin thread fillet 114 (with a pin thread fillet radius B-11), and a pin thread top surface 115 (which is in line with the taper). Although alternative embodiments within the scope of the present disclosure could have non-symmetrical thread profiles, the pin thread profile in the illustrated embodiment has a symmetrical design with a pin thread angle A-11 of 25° and a pin thread fillet radius B-11 of 0.015". Pin 110 has a comparatively large thread root radius C-11 (0.060" in the illustrated embodiment) to minimize stress concentration and to promote longer fatigue life. This is an appreciably larger root radius than in conventional thread forms. For example, two standard thread forms in this size range from the American Petroleum Institute (API), the V-038R and V-050, have root radii of 0.038" and 0.025" respectively. (For purposes of this patent specification, references to "conventional" thread designs or thread forms are intended to be understood as references to standard API thread forms and ANSI (American National Standards Institute) thread forms for comparable thread height ranges.)

In the illustrated embodiment, the 25° pin thread angle A-11 is shallower than in conventional thread designs in order to increase the axial load capacity without increasing stresses in the radial direction. This will result in less compressive stress on the load flank, thus tending to reduce galling.

Figure 6:
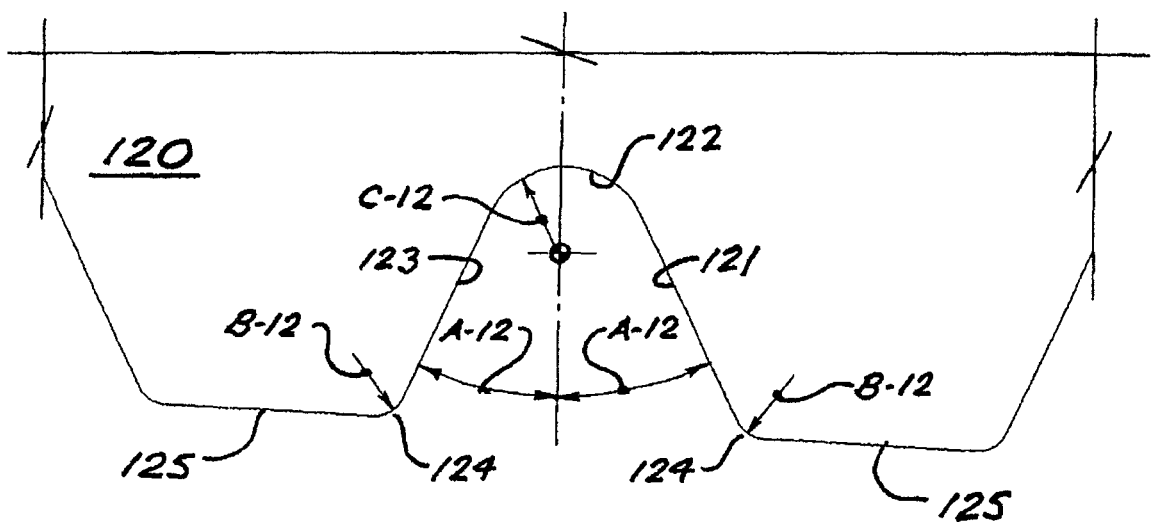
FIG. 6 illustrates the thread profile of the box element shown in FIG. 4.
Figure 7:
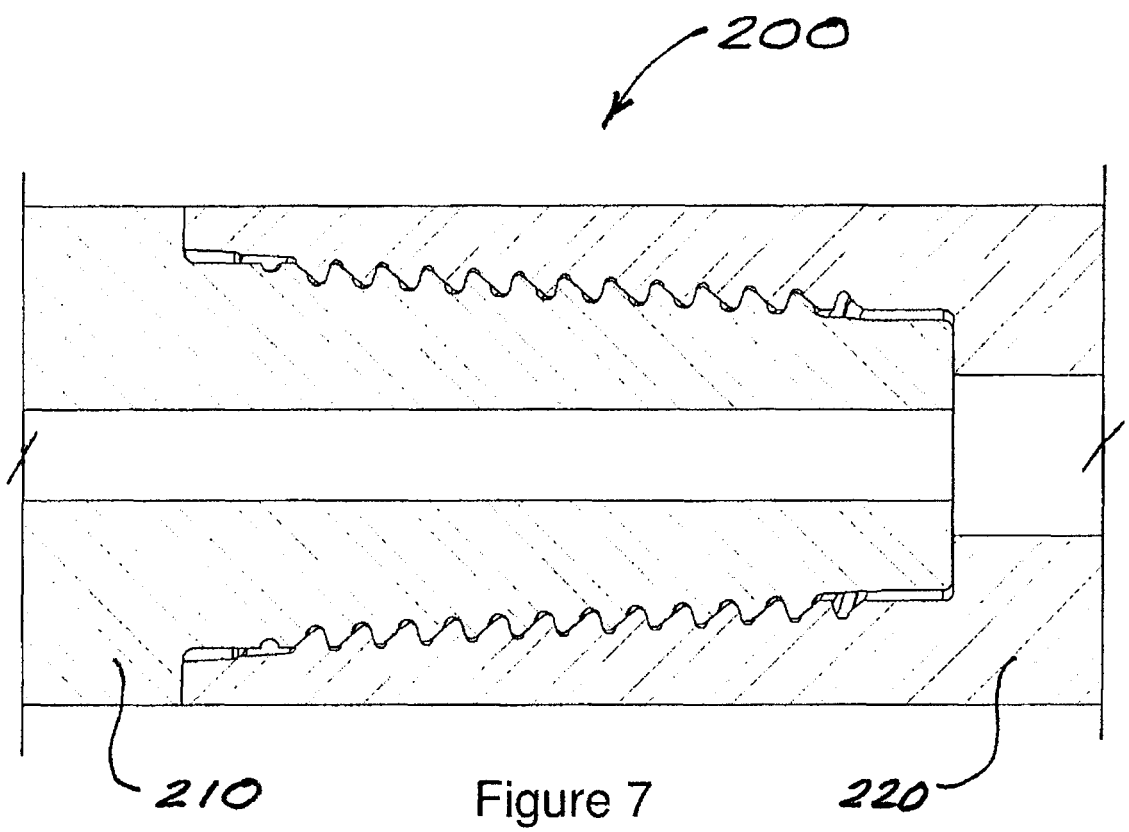
FIG. 7 is a cross-section through a second embodiment of a double-shouldered, tapered-thread connection in accordance with the present disclosure.
Figure 8:
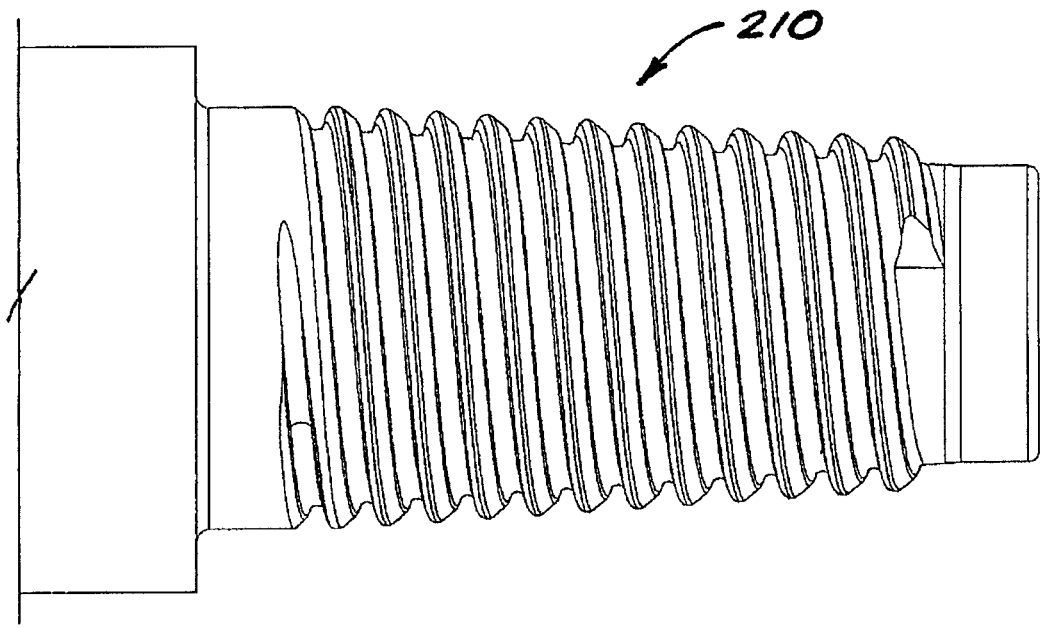
FIG. 8 is a side view of the pin element of the connection shown in FIG. 7.
Figure 9:
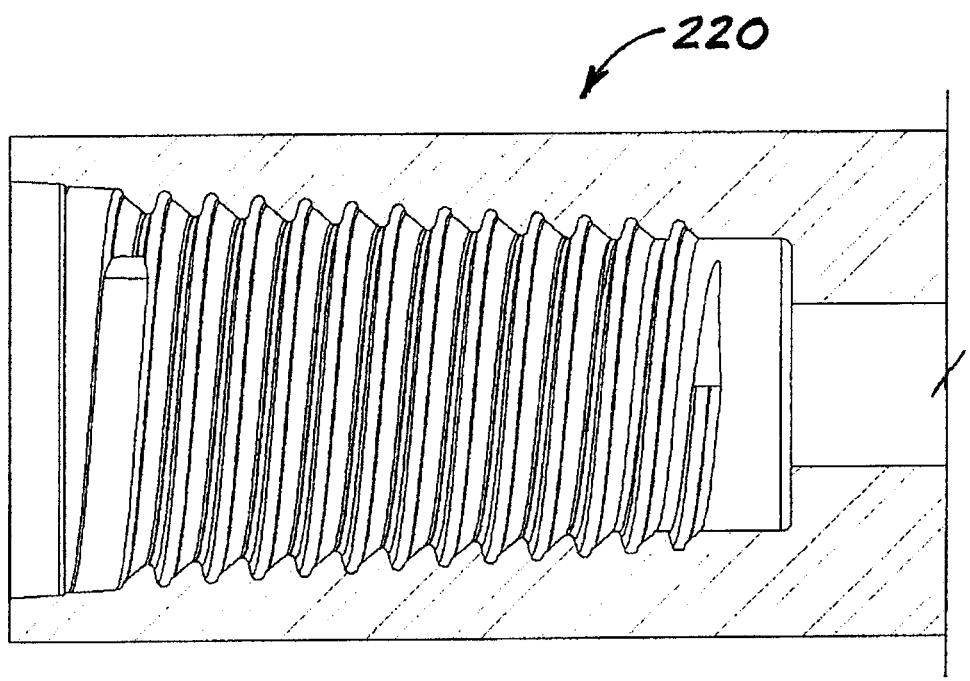
FIG. 9 is a cross-section through the box element of the connection shown in FIG. 7.

FIG. 6 illustrates the thread profile for box element 120, comprising a box thread stab flank 121, a box thread load flank 123, a box thread root 122 (with a box thread root radius C-12), a box thread fillet 124 (with a box thread fillet radius B-12), and a box thread top surface 125. Like the pin thread profile, the box thread profile is also symmetrical in the illustrated embodiment. The box thread profile has a box thread angle A-12 of 25° and a box thread fillet radius B-12 of 0.015". However, the box thread root radius C-12 is 0.040". The difference between box thread root radius C-12 and pin thread root radius C-11 facilitates maintenance of adequate thread contact area without having to use extremely coarse thread.

The provision of different thread radii for the box and the pin, rather than using the same thread root radius for both as in conventional designs, facilitates a balancing of the structural load-resisting characteristics of the box and pin to mitigate or largely eliminate differential structural stresses (such as compression and shear) arising from the difference between the diameters of the box and the pin, thereby increasing the structural capacity of the overall assembly.

The above-described thread profiles were developed using advanced finite element analysis (FEA) techniques that account for both axial and torsional stresses caused by torsional loading of the connection, including at the helical contact interface between the pin and box, which is extremely difficult to model and analyze. Conventional threaded connection analysis does not account for this helical interface and the torsional loading between the threads, so the true stress distribution between the pin and box is not captured. However, through the use of advanced FEA techniques, the benefits of using a pin thread having a thread root radius larger than the box thread root radius became apparent. From a manufacturing perspective, this is contrary to convention because it requires different machining inserts for the pin and box, whereas standard thread forms (such as API threads) are typically the same for the pin and box. However, the advantages of optimizing the connection strength outweigh the extra manufacturing requirements.

Embodiment #2—Connection Having Undercut Buttress Thread Profile

FIGS. 7-11 illustrate a second embodiment 200 of a double-shouldered, tapered-thread, two-start, rotary shouldered connection in accordance with the present disclosure, comprising a pin element 210 and a box element 220. The basic design principle for this embodiment is to maximize the shear area across the threads and maximize torque transfer capacity, while minimizing susceptibility to galling. As may be seen in FIGS. 10 and 11, the pin thread profile and the box thread profile in this embodiment incorporate an undercut buttress design. The undercut buttress design provides minimal thread height while maximizing contact area and facilitating a large thread radius.

Figure 10:
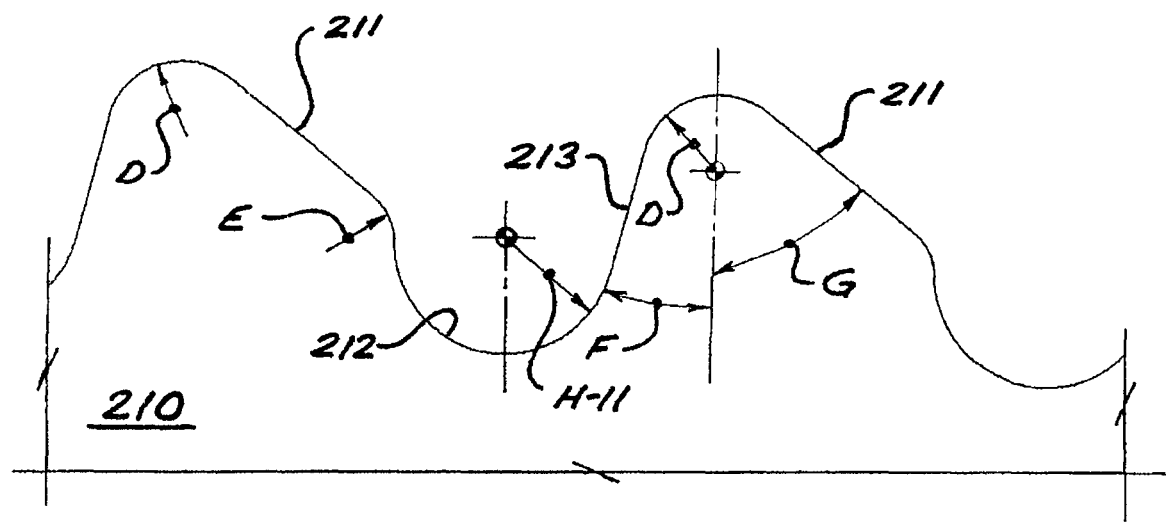
FIG. 10 illustrates the thread profile of the pin element shown in FIG. 8.

In the embodiment shown in FIG. 10, the pin thread profile comprises a pin thread stab flank 211, a pin thread undercut 212 (with a pin thread undercut radius H-11), a pin thread load flank 213, a pin thread top radius D, and a pin thread fillet radius E. In the embodiment shown in FIG. 11, the box thread profile comprises a box thread stab flank 221, a box thread undercut 222 (with a box thread undercut radius H-12, which in the illustrated embodiment is smaller than pin thread undercut radius H-11), a box thread load flank 223, a box thread top radius D, and a box thread fillet radius E.

Although thread top radius D and fillet radius E are the same for both the pin and the box in the illustrated embodiment, this is by way of non-limiting example only. In variant embodiments of connection 200, either or both of these parameters may differ as between the pin and the box, without departing from the scope of the present disclosure.

Figure 11:
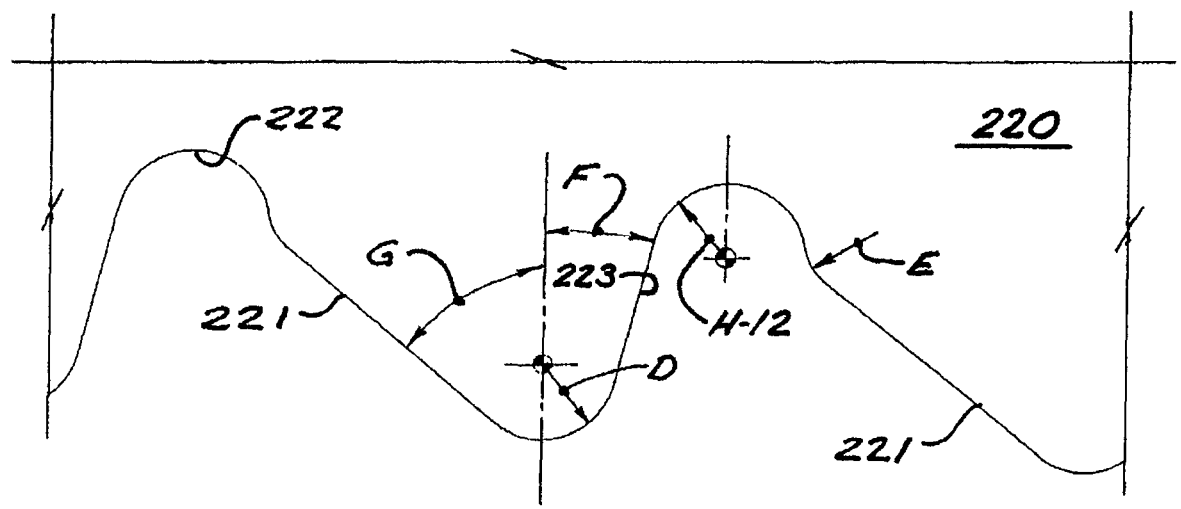
FIG. 11 illustrates the thread profile of the box element shown in FIG. 9.

As can be seen from FIGS. 10 and 11, pin thread load flank 213 and box thread load flank 223 in this design are appreciably more vertical than in V-thread designs to provide larger axial load capacity. In both the pin thread profile and the box thread profile in the illustrated embodiment, the load flank angle F is 15° and the stab flank angle G is 50°.

In the embodiment shown in FIG. 10, the pin thread undercut radius H-11 is 0.060", which is large compared to the pin thread radius in currently available undercut buttress threads. By way of comparative example, the ANSI B1.9 buttress thread form has a root radius of only 0.018" for a thread of comparable thread size (i.e., 4 threads per inch).

The configuration of the undercut feature of the thread profile in this embodiment promotes stress reduction, while maintaining adequate contact and shear area to withstand in-service loadings. A feature of this design is that pin thread undercut 212 is non-tangent to pin thread stab flank 211, as shown in FIG. 10. However, in this specific illustrated embodiment, pin thread undercut 212 is tangent to pin thread load flank 213 to maximize the contact area on pin thread load flank 213.

Numerous two-dimensional and three-dimensional finite element analyses (FEAs) have been performed with respect to the two connection design embodiments described above. The FEA results for the two disclosed thread profiles were nearly identical, with both thread profiles indicating significantly increased torque transfer capacity over currently available thread designs.

The foregoing descriptions and the accompanying drawings indicate various specific dimensions and angles. However, these dimensions and angles are by way of example only. Embodiments in accordance with the present disclosure are not restricted to or limited by the dimensions and angles provided herein, and variant embodiments may use different dimensions and angles without departing from the scope of the disclosure.

It will be readily appreciated by those skilled in the art that various modifications to embodiments in accordance with the present disclosure may be devised without departing from the present teachings, including modifications which may use structures or materials later conceived or developed. It is to be especially understood that the scope of the disclosure and the claims appended hereto should not be limited by any particular embodiments described and illustrated herein, but should be given the broadest interpretation consistent with the disclosure as a whole. It is also to be understood that the substitution of a variant of a disclosed or claimed element or feature, without any substantial resultant change in functionality, will not constitute a departure from the scope of the disclosure or claims.

In this patent document, any form of the word "comprise" is intended to be understood in a non-limiting sense, meaning that any item following such word is included, but items not specifically mentioned are not excluded. A reference to an element by the indefinite article "a" does not exclude the possibility that more than one such element is present, unless the context clearly requires that there be one and only one such element. Any use of any form of any term describing an interaction between elements is not meant to limit the interaction to direct interaction between the elements in question, but may also extend to indirect interaction between the elements such as through secondary or intermediary structure.

The embodiments of the invention in which an exclusive property or privilege is claimed are defined as follows:

1. A rotary shouldered threaded connection comprising:
   (a) a pin element having a pin thread, said pin thread having a pin thread stab flank, a pin thread load flank, a pin thread angle that is less than 30 degrees, and a pin thread root defined by a pin thread root radius; and
   (b) a box element having a box thread, said box thread having a box thread stab flank, a box thread load flank, a box thread angle, and a box thread root radius;
   wherein the pin thread root radius is greater than the box thread root radius;
   wherein the pin thread root is tangent to the pin thread stab flank and the pin thread load flank;
   wherein the pin thread angle comprises a first pin thread angle extending between the pin thread stab flank and a pin thread centerline that is disposed between the pin thread stab flank and the in thread load flank and that extends orthogonal to a central axis of the pin element;
   wherein the pin thread angle further comprises a second pin thread angle that is equal to the first pin thread angle and that extends between the pin thread centerline and the pin thread load flank;
   wherein the box thread angle comprises a first box thread angle extending between the box thread stab flank and a box thread centerline that is disposed between the box thread stab flank and the box thread load flank and that extends orthogonal a central axis of the box element; and
   wherein the box thread angle further comprises a second box thread angle that is equal to the first box thread angle and that extends between the box thread centerline and the box thread load flank.

2. A rotary shouldered threaded connection as in claim 1 wherein the pin thread root radius is larger than the box thread root radius.

3. A rotary shouldered threaded connection as in claim 1 wherein the pin thread and the box thread incorporate mating V-thread profiles.

4. A rotary shouldered threaded connection as in claim 3 wherein the pin thread root radius is appreciably larger than the pin thread root radius in conventional thread designs.

5. A rotary shouldered threaded connection as in claim 1, wherein the connection is a taper-threaded connection.

6. A rotary shouldered threaded connection as in claim 1, wherein the connection is a double-shouldered connection.

7. The rotary shouldered threaded connection of claim 1, wherein:
   the pin thread angle comprises a first pin thread angle extending between the pin thread stab flank and a pin thread centerline disposed between the pin thread stab flank and the pin thread load flank, and the pin thread angle further comprises a second pin thread angle extending between the pin thread centerline and the pin thread load flank which is equal to the first pin thread angle; and
   the box thread angle comprises a first box thread angle extending between the box thread stab flank and a box thread centerline disposed between the box thread stab flank and the box thread load flank, and the box thread angle further comprises a second box thread angle extending between the box thread centerline and the box thread load flank which is equal to the first box thread angle.

8. A rotary shouldered threaded connection comprising:
   (a) a pin element having a pin thread, said pin thread having a pin thread stab flank, a pin thread load flank, a pin thread angle, and a pin thread root radius; and (b) a box element having a box thread, said box thread having a box thread stab flank, a box thread load flank, a box thread angle, and a box thread root radius;

wherein the pin thread root radius is greater than the box thread root radius;

wherein the pin thread angle is less than 30 degrees:

wherein the pin thread angle comprises a first pin thread angle extending between the pin thread stab flank and a pin thread centerline that is disposed between the pin thread stab flank and the pin thread load flank and that extends orthogonal to a central axis of the pin element;

wherein the pin thread angle further comprises a second pin thread angle that is equal to the first pin thread angle and that extends between the pin thread centerline and the pin thread load flank;

wherein the box thread angle comprises a first box thread angle extending between the box thread stab flank and a box thread centerline that is disposed between the box thread stab flank and the box thread load flank and that extends orthogonal a central axis of the box element; and wherein the box thread angle further comprises a second box thread angle that is equal to the first box thread angle and that extends between the box thread centerline and the box thread load flank.

9. The rotary shouldered threaded connection of claim 8, wherein the pin thread comprises a pin thread root defined by the pin thread root radius, and wherein the pin thread root is tangent to the pin thread stab flank and the pin thread load flank.

10. The rotary shouldered threaded connection of claim 8, wherein:

the pin thread root radius extends from a pin thread centerline disposed between the pin thread stab flank and the pin thread load flank;

the box thread root radius extends from a box thread centerline disposed between the box thread stab flank and the box thread load flank; and the rotary shouldered threaded connection is formed between oilfield tubulars.

\* \* \* \* \*